United States Patent
Godunov et al.

(10) Patent No.: US 9,141,431 B1
(45) Date of Patent: Sep. 22, 2015

(54) SYSTEM AND METHOD FOR PRIORITIZING ON ACCESS SCAN AND ON DEMAND SCAN TASKS

(71) Applicant: Kaspersky Lab ZAO, Moscow (RU)

(72) Inventors: Ilya B. Godunov, Moscow (RU); Pavel N. Yarykin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/507,962

(22) Filed: Oct. 7, 2014

(51) Int. Cl.
*G06F 9/50* (2006.01)

(52) U.S. Cl.
CPC ...... *G06F 9/5038* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 6,735,700 B1 | 5/2004 | Flint et al. | |
| 6,765,873 B1 * | 7/2004 | Fichou et al. | 370/235 |
| 7,281,267 B2 | 10/2007 | Tarbotton et al. | |
| 7,584,508 B1 | 9/2009 | Kashchenko et al. | |
| 7,861,303 B2 | 12/2010 | Kouznetsov et al. | |
| 8,015,288 B2 | 9/2011 | Miyajima | |
| 8,479,294 B1 * | 7/2013 | Li et al. | 726/24 |
| 8,635,672 B2 | 1/2014 | Yamada | |
| 2003/0012143 A1 | 1/2003 | Chen et al. | |
| 2005/0149749 A1 | 7/2005 | Brabant | |

OTHER PUBLICATIONS

"A preemptive connection pool manager for web-based application collaboration" Zhen Zhao Comcast, 1701 John F. Kennedy Blvd, Philadelphia, PA 19103 8th International Conference Conference on Collaborative Computing: Networking, Applications and Worksharing , Collaboratecom 2012 Pittsburgh, PA, United States, Oct. 14-17, 2012.

* cited by examiner

*Primary Examiner* — Eric C Wai
(74) *Attorney, Agent, or Firm* — Arent Fox LLP; Michael Fainberg

(57) ABSTRACT

Disclosed are systems and methods for prioritizing scan requests. An example method includes reserving, by a computer processor, one or more connections between a thin client and a virtual machine of a computer; when one or more of the reserved connections are not used for communicating on-access scan (OAS) requests or on-demand scan (ODS) requests, allocating said one or more reserved connections for communicating OAS or ODS requests between the thin client and the virtual machine; and when all the reserved connections are used for communicating OAS or ODS requests, and at least one reserved connection is used for communicating ODS requests, reallocating for communicating the OAS requests the at least one reserved connection used for communicating ODS request.

17 Claims, 3 Drawing Sheets

SYSTEM AND METHOD FOR PRIORITIZING ON ACCESS SCAN AND ON DEMAND SCAN TASKS

TECHNICAL FIELD

The present invention relates generally to the field of computer science, and more specifically, to systems, methods and computer program products for prioritizing on access scan and on demand scan tasks.

BACKGROUND

Modern computer operating systems and applications have become increasingly resource intensive when interacting with hardware and software components of the computer system. Although developers continually improve the operation of operating systems and computer applications, as their complexity increases, so does the demand for system resources. An example of a resource-demanding application is an antivirus application. Antivirus applications interact extensively with a computer system's software and hardware components during system scans for malicious software, such as viruses, worms, spyware and other types of malware that threatens security of the computer system.

Some computer applications, including many antivirus applications, periodically scan computer systems to monitor activity and identify malware. Such scans can affect system resource utilization, including server, processor, memory, hard drive and network utilization. In certain instances, computer resource scans may overload the computer system and/or server and impair performance. Accordingly, there is a need for a system architecture and process for efficiently prioritizing scan requests of a computer system.

SUMMARY

Disclosed are systems and methods for prioritizing scan requests. An example method includes reserving, by a computer processor, one or more connections between a thin client and a virtual machine of a computer; when one or more of the reserved connections are not used for communicating on-access scan (OAS) requests or on-demand scan (ODS) requests, allocating said one or more reserved connections for communicating OAS or ODS requests between the thin client and the virtual machine; and when all the reserved connections are used for communicating OAS or ODS requests, and at least one reserved connection is used for communicating ODS requests, reallocating for communicating the OAS requests the at least one reserved connection used for communicating ODS request.

In another example aspect, the thin client may be running on another virtual machine of the computer.

In another example aspect, the computer includes a server.

In another example aspect, the thin client may perform reservation, allocation and reallocation of connections between the thin client and the virtual machine.

In another example aspect, the method further includes reallocating one or more used reserved connections for communicating the OAS requests further includes halting by the virtual machine processing of ODS requests associated with the reallocated connections.

In another example aspect, OAS scanning includes scanning by the virtual machine in real time of at least file system activity or network activity of the computer.

In another example aspect, ODS scanning includes scanning by the virtual machine of one or more of files, folders and disk partitions of the computer.

In another aspect, an example system for prioritizing scan requests, comprises a virtual machine deployed on a computer, the virtual machine configured to perform on-access scan (OAS) and on-demand scan (ODS) of an object on the computer; and at least one thin client deployed on the computer, the thin client configured to reserve one or more connections between the thin client and the virtual machine; when one or more of the reserved connections are not used for communicating OAS requests or ODS requests, allocate said one or more reserved connections for communicating OAS requests or ODS requests between the thin client and the virtual machine; and when all the reserved connections are used for communicating OAS requests or ODS requests, and at least one reserved connection is used for communication ODS requests, reallocate for communicating the OAS requests the at least one reserved connection used for communication ODS requests.

In another aspect, an example computer program product, stored on a non-transitory computer-readable storage medium, comprises computer-executable instructions for prioritizing scan requests, including instructions for: reserving, by a computer processor, one or more connections between a thin client and a virtual machine of a computer; when one or more of the reserved connections are not used for communicating on-access scan OAS requests or on-demand scan (ODS) requests, allocating said one or more reserved connections for communicating OAS requests or ODS requests between the thin client and the virtual machine; and when all the reserved connections are used for communicating OAS requests or ODS requests, and at least one reserved connection is used for communication ODS requests, reallocating for communicating the OAS requests the at least one reserved connection used for communicating ODS requests.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for prioritization of on access scan over on demand scan tasks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

One approach for effectively utilizing computer resources during system and application scans is virtualization. Virtualization allows multiplexing of an underlying computer system between different virtual machines so that multiple users can simultaneously access resources on the computer system. A virtual machine (VM) is a software environment which ensures the working within one physical ("real") machine (such as a computer or server) of another real computer. Several virtual machines can operate at the same time on one physical machine, which is also known as the "host machine", thereby forming a virtual computer environment. In this case, the virtual machines utilize the same computing resources of the host machine. The computer system allocates a certain amount of its resources to each of the virtual machines. Each virtual machine is then able to use the allocated resources to execute applications, including operating systems.

Figure 1:
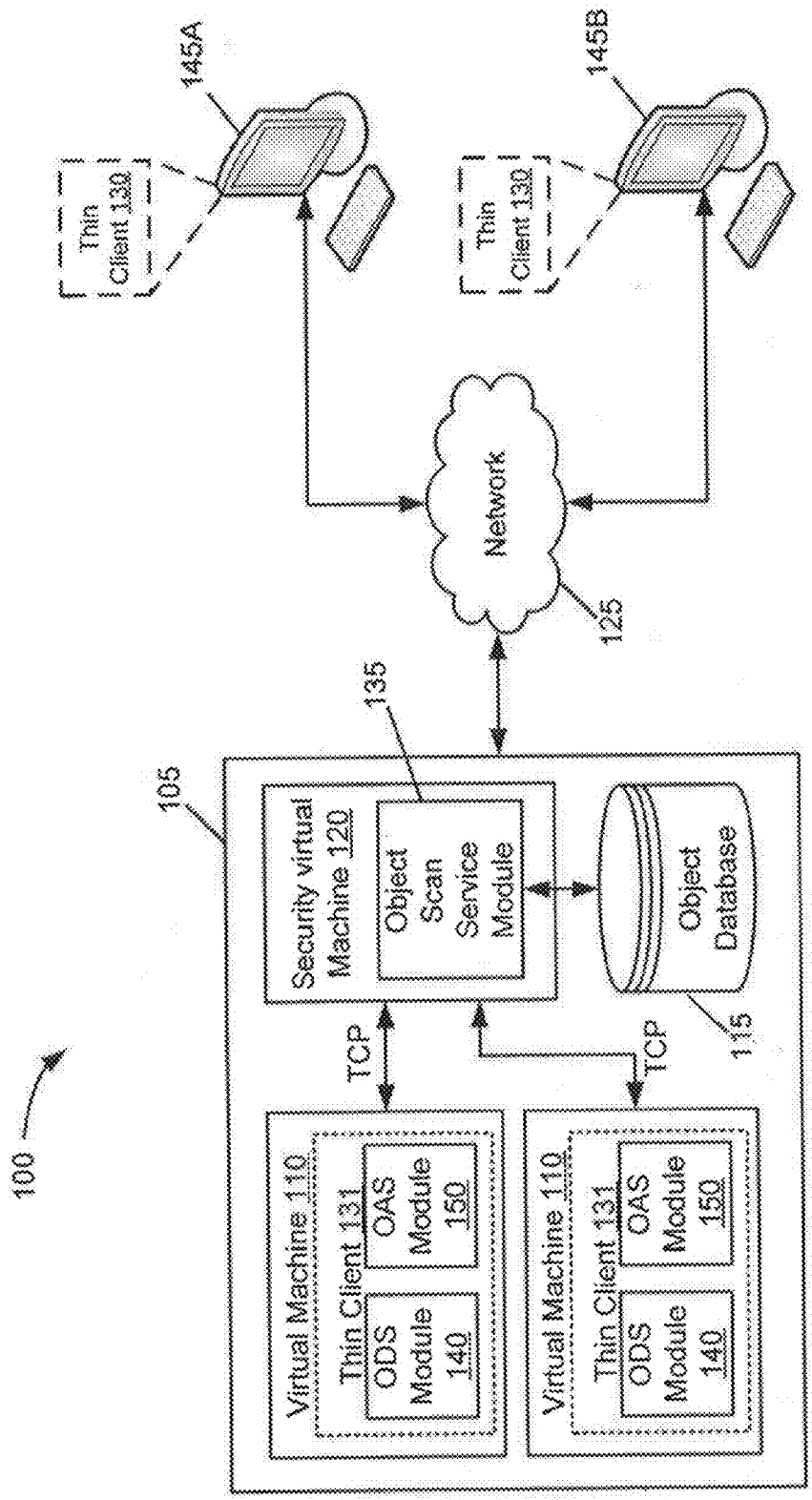
FIG. 1 is a diagram illustrating an example configuration of a system for prioritization of on access scan over on demand scan tasks according to one aspect of the invention.

FIG. 1 is an example configuration of a virtual machine architecture for prioritizing scan requests according to aspects of the present invention. As shown, computer system 100 may include a server 105 on which are deployed several virtual machines 110. The number of virtual machines may be, for example, several virtual machines (e.g., between 1 and 10) or even hundreds. The presence of a large or even enormous number of virtual machines (VMs) requires a corresponding volume of computing resources. Therefore, the virtual machines may be deployed on a single server 105 or several servers 105. In one example aspect, connections between the virtual machines 110 may be established, for example, via a Transmission Control Protocol (TCP). The server 105 may be connected to multiple user thin clients 130, such as Citrix® ICA, over a network 125. The term network as used herein includes, but is not limited to, the Internet, a local area network (LAN), and a wireless local area network (WLAN).

In one aspect, a system thin client 131 may be installed on each virtual machine 110, while a user thin client 130 may be installed on a user device 145 including, but not limited to, a desktop or a laptop computer. In another aspect, the thin clients 130, 131 are client programs in networks with a client-server architecture that transfers all or the bulk of the information processing tasks to the server. The thin clients 130, 131 are operable to communicate with corresponding virtual machines 110 running on the server 105.

In one example aspect, each virtual machine 110 may provide a virtual desktop (not shown) for display on the user thin client 130 and execute various programs and applications provided by the server 105, such as for example, a text editing program, an accounting program, an anti-malware program, an antivirus program, and other types of programs. The virtual machine 110 also provides to the thin clients 130, 131 access to data objects, such as files stored in the object database 115 or in the virtual machine 110. Access to the objects on the server 105 may be performed using an on demand scan ("ODS") module 140 and an on access scan ("OAS") module 150 of the thin clients 130 and 131. In one example aspect, the server 105 may execute an anti-malware program, such as an antivirus program, installed on the security virtual machine ("SVM") 120, where the anti-malware program may perform either an on demand scan or on access scan of certain objects stored on the virtual machine 110. In other example aspects, the objects for scanning (such as objects common to several virtual machines) may be located in the object database 115, and the virtual machine 110 would indicate (for example, by providing a checksum for an object) which object is to be scanned.

In one aspect, the server 105 may also deploy a security virtual machine 120 that includes an object scan service module 135 that manages access to the object database 115 for multiple thin clients 130 and 131. The result of scanning an object by the object scan service module 135 is a scanning log or scanning data returned to the thin client 130 and 131, which provided the object for scanning on a virtual machine 110 or an indicator of which object to scan, when the object is stored outside the virtual machine 110, for example in the object database 115. The term module as used herein means a real-world device, apparatus, system, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 below).

In one example aspect, thin clients 130, 131 send scan requests via ODS or OAS modules 140, 150 to the security virtual machine 120. The object scan service module 135 performs the requested scans of an object or objects on the virtual machine 110 or in the object database 115 and other server resources. In one aspect, the scan requests include a series of events that are transmitted via the connections established between the virtual machine 110 and the security virtual machine 120. In one aspect, the ODS scanning is a scanning on demand, wherein the indicated objects such as files, folders, disk partitions of the virtual machine 110 or of the object database 115 are scanned. In ODS scanning of a large number of objects, the stream of events for scanning may be voluminous, in another aspect, the OAS scanning is a scanning in real time of the activities of a file system, network activity, and so on, and the stream of events from OAS needs to be handled and objects need to be scanned rather quickly in priority mode, since a long waiting time for the scan results may significantly slow down the working of the entire system, which does not occur in the case of ODS scanning. If all the established network connections are occupied with processing of requests from the ODS module 150, while the throughput capacity is limited by n number of connections (e.g., 6 connections), then the requests from the OAS module 140 cannot be processed with maximum speed until the requests from the ODS module 150 are processed and this may adversely affect the performance of the entire virtual machine 110.

In another example aspect a user thin client 130 runs on a user device 145 (i.e. 145A or 145B) and communicates via the network 125 with the VM 110 running on the server 105. A system thin client 131 running on the VM 110 communicates with an SVM 120 and includes an ODS module 140 and an OAS module 150. In this example aspect, the user thin client 130 uses an application running on the VM 110. When this application attempts to access some object stored on the VM 110, the OAS module 150 on the VM 110 sends (for example, using the TCP protocol) a request to the object scan service module 135 running on the SVM 120 to perform an OAS of the object. The object scan service module 135 running on the SVM 120 would have access to the object to be scanned on the VM 110 (or on the object database 115) or receive a copy of the object to be scanned (from the VM 110 or from the object database 115). The results of the scan (such as logs and other information) would be transmitted (for example, using the TCP protocol) from the object scan service module 135 on the SVM 120 to the OAS module 150 on the VM 110 and then to the user thin client 130 on the user device 145 via the network 125. The results of the scan would determine whether the application running on the VM 110 that attempted to access the scanned object would be granted that access (depending, for example, on whether any malware was found in the object by the OAS). In this example aspect, the user thin client 130 may also request an ODS of an object or objects stored on the VM 110 (for example, by using an antivirus or anti-malware program running on the VM 110) to gather information about the objects, for example, to check whether any of these objects contain any malware. The ODS module 140 running on the VM 110 sends (for example, using the TCP protocol) a request to the object scan service module 135 running on the SVM 120 to perform an ODS of the object or objects. The object scan service module 135 running on the SVM 120 would have access to the object or objects to be scanned on the VM 110 (or on the object database 115) or receive a copy of the object or objects to be scanned (from the VM 110 or from the object database 115). The results of the scan (such as logs and other information) would be transmitted (for example, using the TCP protocol) from the object scan service module 135 on the SVM 120 to the ODS module 140 on the VM 110 and then to the user thin client 130 on the user device 145 via the network 125. The VM 110 and the SMV 120 may run on the same server 105 or on different servers.

In this example aspect, the TCP communications comprise a stream of events used to transmit the scan requests and the scan results (such as logs and other information) between the VM and the SVM. An OAS would usually result in comparatively few events to be transmitted with comparatively high urgency and comparatively high priority not to delay any application execution. An ODS of multiple files would usually result in comparatively many events to be transmitted with comparatively low urgency and comparatively low priority because the ODS is conducted in the course of information gathering, rather than application running. In this example aspect, if the same TCP connections were used for ODS event transmission and OAS event transmission, the voluminous stream of ODS events running through these connections would hinder the speed of OAS event transmission, denying urgency and priority to the OAS event transmission. However, when in this example aspect a separate TCP connection or connections are dedicated for transmitting OAS events (not for transmitting ODS events), the urgency and priority of the OAS event transmission are much less deteriorated even in presence of high volume of ODS event traffic on other TCP connections.

Figure 2:
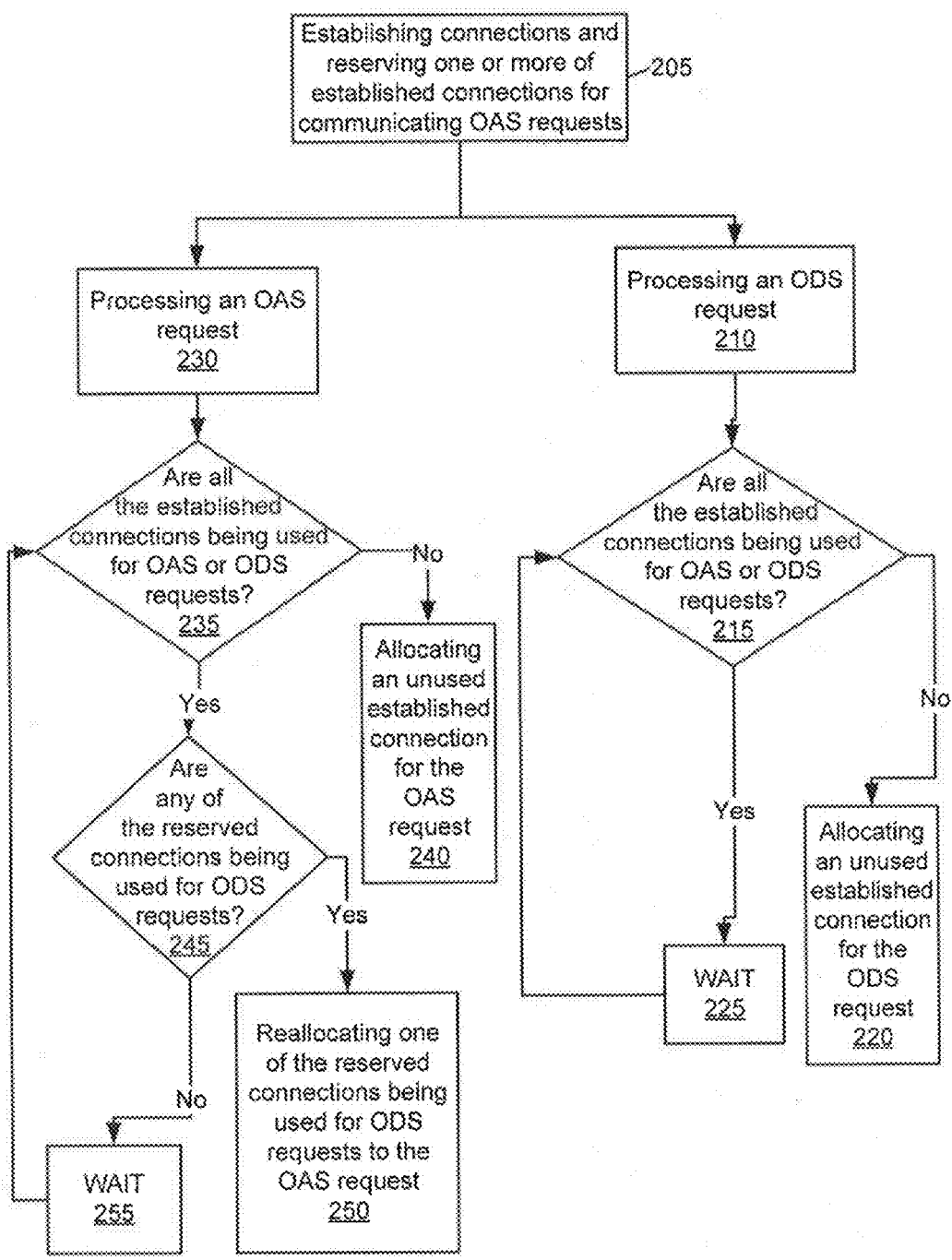
FIG. 2 is a flow diagram illustrating an example method for prioritization of on access scan over on demand scan tasks according to one aspect of the invention.

FIG. 2 illustrates an example of a method for prioritizing scan requests according to aspects of the present invention. At step 205 the system thin client 131 running on the VM 110 establishes a number of connections between the VM 110 and the SVM 120. If all of the established connections between the virtual machine 110 and security virtual machine 120 are occupied processing requests by the on demand scan module 140, then requests from the on access scan module 150 cannot be processed with maximum speed. Therefore, at step 205, the method also includes reserving one or more of the established connections between the virtual machine 110 and the special virtual machine 120 for communicating OAS requests to the special virtual machine 120.

At step 210, the system thin client 131 needs to transmit an on demand scan request to the security virtual machine 120 and to receive the scan results in response from the SVM 120. At step 215, the system thin client 131 running on the VM 110 determines if all of the established connections are being used by the OAS module 150 for on access scan requests or by the ODS module 140 for on demand scan requests. If no, then at step 220, the system thin client 131 running on the VM 110 allocates an available connection for the on demand scan request. In other words, when the OAS module 150 and the ODS module 140 of a virtual machine 110 are not using all of the established connections, the available established connections can be allocated to the on demand scan module 140. The VM 110 then transmits a request to the object scan service module 135 on the SVM 120 to perform the on demand scan of specified objects on the VM 110 or in the object database 115.

Alternatively, if the system thin client 131 determines that all of the established connections are being used for scan requests, then at step 225, the system thin client 131 may wait until one of the established connections becomes available or until expiration of an object scanning timeout. If one of the established connections becomes available, the system thin client 131 may use it to request the ODS of the object. If the scan timeout expires before one of the established connections becomes available, then the ODS of the object may be postponed or skipped altogether. When the system thin client 131 determines that an established connection is not being used, then the system thin client 131 proceeds to step 220 to allocate an established connection to the ODS module 140.

At step 230, the system thin client 131 needs to transmit an on access scan request to the security virtual machine 120 and to receive the scan results in response from the SVM 120. At step 235, the system thin client 131 running on the VM 110 determines if all of the established connections are being used by the OAS module 150 for on access scan requests or by the ODS module 140 for on demand scan requests. If no, then at step 240, the system thin client 131 running on the VM 110 allocates an available connection for the on access scan request, in other words, when the OAS module 150 and the ODS module 140 of a virtual machine 110 are not using all of the established connections, the available established connections can be allocated to the on access scan module 150. The VM 110 then transmits a request to the object scan service module 135 on the SVM 120 to perform the on access scan of specified objects on the VM 110 or in the object database 115.

Alternatively, if the system thin client 131 determines that the OAS module 150 and the ODS module 140 of the system thin client 131 are using all of the established connections, the system thin client 131 at step 245 checks if any of the reserved connections are used by the ODS module 140 for on demand scan requests. If such reserved connections exist, the system thin client 131 reallocates such reserved connections to the OAS module 150 to perform an on access scan in step 250. In other words, the on access scan module 150 will take over connections used by the on demand scan module 140. The trigger for displacing an on demand scan is the appearance of an on access scan request that cannot be transmitted because all connections reserved for the OAS module 150 are busy and at least one of these connections is handling an ODS. In this case, a reserved connection used by the ODS module 140 is allocated to process the event from the on access scan module 150. In one aspect, the thin client can conduct a forced transfer of a reserved connection from the ODS module 140 to the OAS module 150. Under such circumstances, not only is the on demand scan interrupted, but the processing of requests from the ODS module 140 may be stopped by the thin client 131 (or even by the security virtual machine 120) so that the requests from the OAS module 140 are processed more quickly.

Alternatively, if the system thin client 131 determines that all of the established connections are being used for scan requests and of the reserved connections are being used for OAS requests, then at step 255, the system thin client 131 may wait until one of the established connections becomes available or until expiration of an object scanning timeout. If one of the established connections becomes available, the system thin client 131 may use it to request the OAS of the object. The system thin client 131 at step 245 checks if any of the reserved connections are used by the ODS module 140 for on demand scan requests. If such reserved connections exist, the system thin client 131 reallocates such reserved connections to the OAS module 150 to perform an on access scan in step 250. If the scan timeout expires before one of the established connections becomes available and all the reserved connections are used by the OAS module 150, then the OAS of the object may be postponed or skipped altogether. When the system thin client 131 determines that an established connection is not being used, then the system thin client 131 proceeds to step 240 to allocate an established connection to the ODS module 140. When the system thin client 131 determines that any of the reserved connections are used by the ODS module 140 for on demand scan requests, the system thin client 131 proceeds to step 250 to reallocate such reserved connections to the OAS module 150 to perform an on access scan.

As discussed above, the prioritizing of scan requests can be performed by the thin clients 130, 131 of corresponding virtual machines 110, the components of which include the OAS module 150 and the ODS module 140. Alternatively, the security virtual machine 120 can be configured to handle the entire prioritization of scan requests and transmit instructions to the thin clients 130, 131 to allocate reserved connections to the ODS module 140 or the OAS module 150. When the security virtual machine 120 is configured to handle the entire prioritization of scan requests, it may consider not only the local busy state of a virtual machine 110, but also that of the entire computer system 100. For example, if on demand scanning is being performed on three out of four deployed virtual machines 110, then the security virtual machine 120 will interrupt on demand scanning on the remaining fourth virtual machine 110 or not allow it to begin until the on demand scanning has completed on one of the other three virtual machines 110. In another aspect, the prioritization of scan requests can be transferred to a security server.

Figure 3:
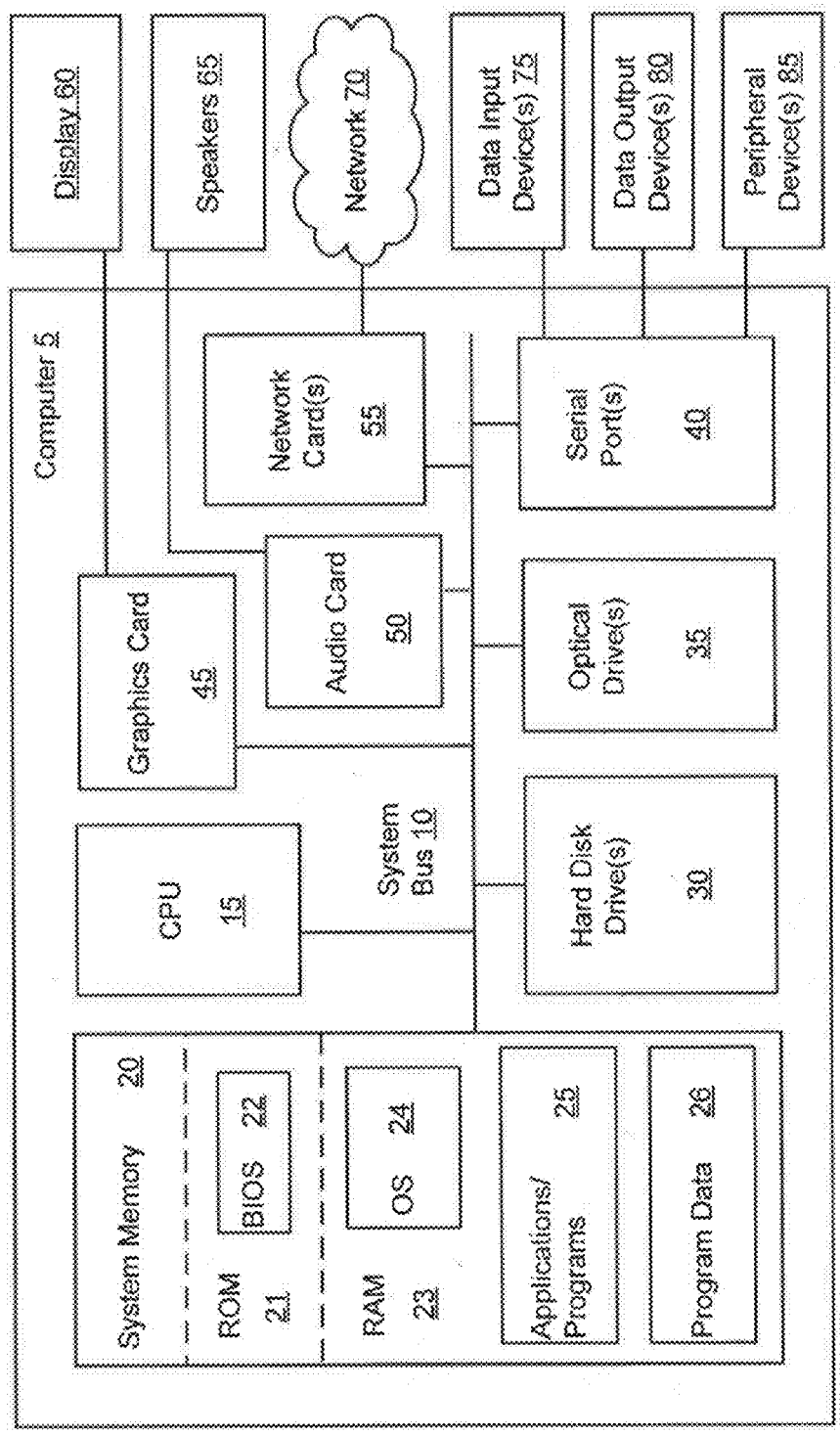
FIG. 3 is a diagram illustrating an example general-purpose computer system for implementing the systems and methods for prioritization of on access scan over on demand scan tasks in accordance with aspects of the invention.

FIG. 3 depicts one example aspect of a computer system 5 that can be used to implement the disclosed systems and methods for prioritizing scan requests according to example aspects. The computer system 5 may include, but is not limited to, a personal computer, a notebook, tablet computer, a thin or thick client computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for prioritizing scan requests, the method comprising:
   reserving, by a computer processor, two or more connections between a thin client and a security virtual machine on a computer, wherein the thin client is running on another virtual machine of the computer;
   when one or more of the reserved connections, are not used for communicating on-access scan (OAS) requests or on-demand scan (ODS) requests, allocating said one or more reserved connections for communicating OAS or ODS requests between the thin client and the security virtual machine, wherein the OAS and ODS requests are requested by the thin client for execution by the security virtual machine, and wherein the OAS and ODS requests cannot share a same reserved connection;
   determining whether all the reserved connections are used for communicating OAS or ODS requests and at least one reserved connection is used for communicating ODS requests; and
   when none of the reserved connections are used for communicating OAS requests and responsive to the determining, reallocating for communicating the OAS requests the at least one reserved connection used for communicating ODS requests.

2. The method of claim 1, wherein the computer includes a server.

3. The method of claim 1, wherein the thin client performs reservation, allocation and reallocation of connections between the thin client and the security virtual machine.

4. The method of claim 1, wherein reallocating at least one reserved connection for communicating the OAS requests further includes halting by the virtual machine processing of ODS requests associated with the least one reallocated connection.

5. The method of claim 1, wherein OAS scanning includes scanning by the security virtual machine in real time of at least file system activity or network activity of the computer.

6. The method of claim 1, wherein ODS scanning includes scanning by the security virtual machine of one or more of files, folders and disk partitions of the computer.

7. A system for prioritizing scan requests, the system comprising:
   a virtual machine deployed on a computer, wherein the computer includes a hardware processor and memory, and wherein the virtual machine configured to perform on-access scan (OAS) and on-demand scan (ODS) of an object on the computer; and
   at least one thin client deployed on the computer, the thin client configured to:
   reserve two or more connections between the thin client and the security virtual machine, wherein the thin client is running on another virtual machine of the computer;
   when one or more of the reserved connections are not used for communicating OAS requests or ODS requests, allocate said one or more reserved connections for communicating OAS requests or ODS requests between the thin client and the security virtual machine, wherein the OAS and ODS requests are requested by the thin client for execution by the security virtual machine, and wherein the OAS and ODS requests cannot share a same reserved connection;
   determine whether all the reserved connections are used for communicating. OAS or ODS requests and at least one reserved connection is used for communicating ODS requests: and
   when none of the reserved connections are used for communicating OAS requests and responsive to the determining, reallocate for communicating the OAS requests the at least one reserved connection used for communication ODS requests.

8. The system of claim 7, wherein the computer includes a server.

9. The system of claim 7, wherein reallocating one or more used reserved connections for communicating the OAS requests further includes halting by the security virtual machine processing of ODS requests associated with the reallocated connections.

10. The system of claim 7, wherein OAS scanning includes scanning by the security virtual machine in real time of at least file system activity or network activity of the computer.

11. The system of claim 7, wherein ODS scanning includes scanning by the security virtual machine of one or more of flies, folders and disk partitions of the computer.

12. A computer program product stored on a non-transitory computer-readable storage medium, the computer program product comprising computer-executable instructions for prioritizing scan requests, including instructions for:
   reserving, by a computer processor, two or more connections between a thin client and a security virtual machine of a computer, wherein the thin client is running on another virtual machine of the computer;
   when one or more of the reserved connections are not used for communicating on-access scan OAS requests or on-demand scan (ODS) requests, allocating said one or more reserved connections for communicating OAS requests or ODS requests between the thin client and the security virtual machine, wherein the OAS and ODS requests are requested by the thin client for execution by the security virtual machine, and wherein the OAS and ODS requests cannot share a same reserved connection;
   determining whether all the reserved connections are used for communicating OAS or ODS requests and at least one reserved connection is used for communicating ODS requests; and
   when none of the reserved connections are used for communicating OAS requests and responsive to the determining, reallocating for communicating the OAS requests the at least one reserved connection used for communicating ODS requests.

13. The product of claim 12, wherein the computer includes a server.

14. The product of claim 12, wherein the thin client performs reservation, allocation and reallocation of connections between the thin client and the security virtual machine.

15. The product of claim 12, wherein reallocating one or more used reserved connections for communicating the OAS requests further includes halting by the security virtual machine processing of ODS requests associated with the reallocated connections.

16. The product of claim 12, wherein OAS scanning includes scanning by the security virtual machine in real time of at least file system activity or network activity of the computer.

17. The product of claim 12, wherein ODS scanning includes scanning by the security virtual machine of one or more of files, folders and disk partitions of the computer.

* * * * *